July 17, 1923.

W. T. WOOD

COASTING VEHICLE

Filed May 5, 1922

1,462,312

Inventor
William T. Wood,
by
Attorney

Patented July 17, 1923.

1,462,312

UNITED STATES PATENT OFFICE.

WILLIAM THOMAS WOOD, OF NASHVILLE, TENNESSEE.

COASTING VEHICLE.

Application filed May 5, 1922. Serial No. 558,691.

*To all whom it may concern:*

Be it known that I, WILLIAM T. WOOD, a resident of Nashville, in the county of Davidson and State of Tennessee, a citizen of the United States, have invented certain new and useful Improvements in Coasting Vehicles, of which the following is a specification.

My invention relates to improvements in coasting vehicles such as are used by children in coasting upon inclined roads or hills, and one object of the invention is the provision of such a vehicle which can be easily managed and controlled and thus rendered entirely safe under all conditions.

Another object of my invention is the provision of a vehicle of this character which will be composed of very few parts in order that it will withstand hard usage and not be likely to breakage and which will insure the production of an article of this character at a very low price.

Another object of my invention is the provision of a coasting vehicle which will be comfortable and very easy of management and control and which will be light in weight and thoroughly efficient and practical from every standpoint.

Figure 1:
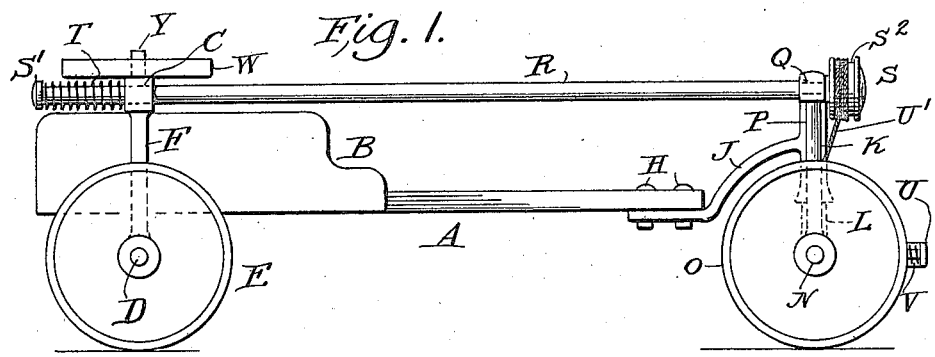

With these objects in view my invention consists of a coasting vehicle embodying novel features of construction and combination of parts substantially as herein described and claimed, and as shown in the accompanying drawing, wherein:

Figure 1 represents a side elevation of a coasting vehicle constructed in accordance with my invention.

Figure 2:
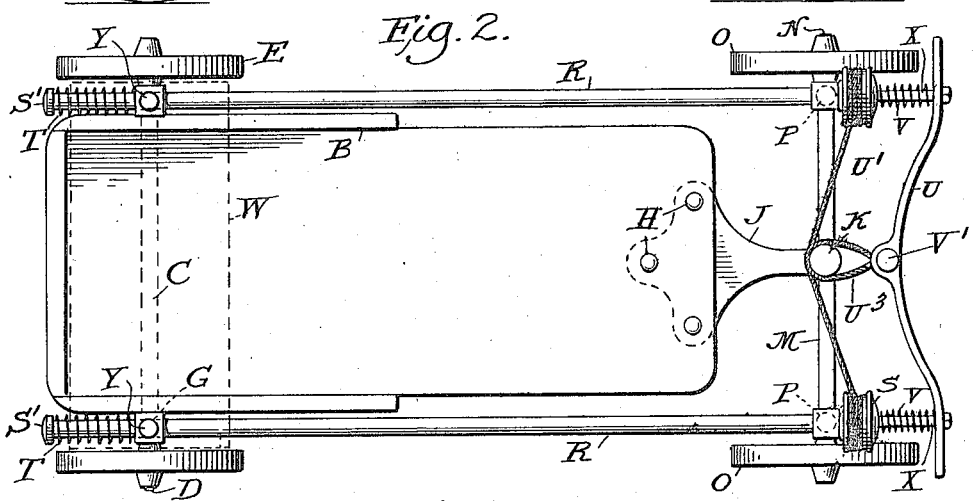

Fig. 2 represents a top plan view of the vehicle.

Figure 3:
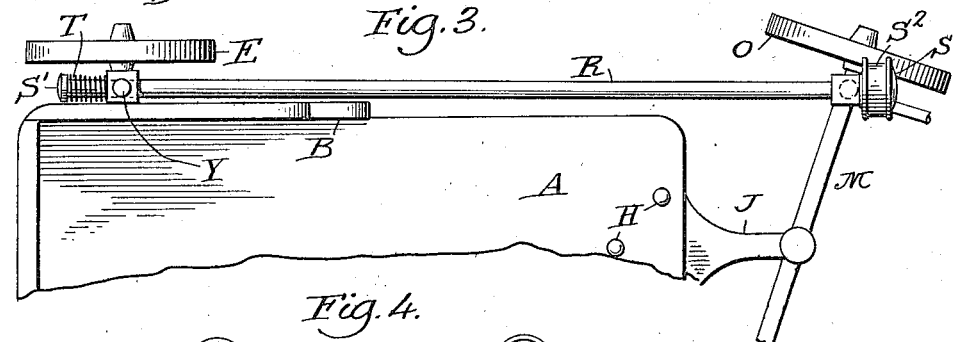
Figure 4:
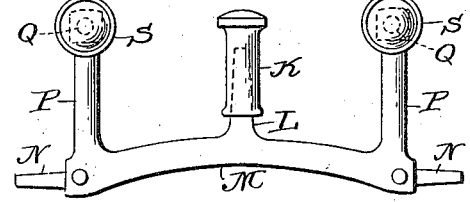

Fig. 3 represents a top plan view of one half of the vehicle, showing the manner of turning the front axle in the guiding of the vehicle, and Fig. 4 represents a front elevation of the forward or pivoted axle.

Referring by letter to the drawing in which similar letters are employed to denote the same parts in the several views:

The letter A, designates the body or platform of my vehicle, which at one end is provided with the box-like portion B, said body being of rectangular shape and of the desired size, and said body is supported at its rear end upon the axle C, which is formed with spindles D, forming the axles for the rear supporting wheels E, while said axle is further provided with the pair of posts or uprights F, which are provided with openings G, for a purpose to presently appear, and with lugs Y, to secure the seat W.

To the forward part of the body or platform is connected at H, the bracket J, which has formed integral therewith, or attached thereto the vertical socket K, which socket rests upon the upstanding lug L, formed centrally of the forward axle M, having the spindles N, forming the axles for the forward supporting wheels O, said axle being further provided with the pair of posts or uprights P, which at their upper end have an opening Q, said openings in normal position being in line with the openings G of the uprights F, and mounted in said openings G and Q, are the pair of rods or bars R, which have at their forward ends the heads or stops S, and at their rear ends are formed with a head S', said inner ends extending inwardly a sufficient distance to receive the coiled springs T.

From this construction it will be observed that I provide a peculiar construction of front and rear axle and that the body is secured rigidly to the rear axle and through the medium of the front axle and pivoted bracket, said front axle may be turned to either side by movement of either of the side bars or rods R, as shown in Figure 3, thus permitting the rider to guide the machine in either direction by the moving of either of said rods R, and that the coiled springs T, serve to cushion said rods and to retain them in normal position, while allowing the proper guiding movement through the manipulation of said rods.

The heads S at the forward ends of the bars or rods R, have the general appearance of lamps and are formed with grooves or channels $S^2$, which receive the brake controlling cord or cable U', which passes around the socket past K, and forms the central loop $U^3$, which is connected to the inner central portion V', of the fender and brake member U, which brake member is guided by the pins X, surrounded by the cushion or shock absorbing springs V.

It will thus be seen that the vehicle is under absolute control of the user under all conditions and that the vehicle can be instantly turned to right or left by movement of the rods or bars R, and that the brake member U can be instantly applied by turning of either of the heads S, as will be readily understood.

It will be observed that the occupant of the vehicle can either recline or sit in upright position upon the vehicle with hands upon the pair of side bars, and that the vehicle is easily guided in a straight line, and when desired to make a turn to the right or left it is simply necessary to move either rod or bar forward to give a turn to the front pivoted axle and thus a coasting vehicle is provided which will be under the guidance or control of the operator under all conditions and will commend itself as a useful, desirable and practical article of this character.

I claim:

1. A vehicle of the character described, consisting of a body or platform, a rear axle carrying wheels and rigidly secured to said body, a front axle carrying wheels and pivotally mounted with reference to said body, a pair of uprights formed on said front and rear anxle and in normal position being in line, and a pair of sliding rods mounted in said uprights for turning the front pivoted axle to guide said body.

2. A vehicle of the character described, consisting of a body or platform, a rear axle carrying wheels and rigidly secured to said body, a front axle carrying wheels and pivotally mounted with reference to said body, a pair of uprights formed on said front and rear axle and in normal position being in line, a pair of sliding rods mounted in said uprights for turning the front pivoted axle to guide said body, springs around said pair of rods to cushion and return the rods to normal position, and a resilient fender mounted at the forward end of said vehicle.

3. A vehicle of the character described, consisting of a body or platform, a rear axle connected to the body, wheels carried by said axle, a front axle pivotally mounted with reference to the body, wheels carried by the front axle, a pair of uprights mounted on said axles, a pair of bars slidingly mounted in said uprights, heads rotatable on said bars, a yieldable fender and brake member carried by the front axle, and an operating connection between the heads and brake for controlling said brake.

In testimony whereof I hereunto affix my signature.

WILLIAM THOMAS WOOD.